July 26, 1932.  H. R. WEST  1,869,125

VARIABLE VOLTAGE TRANSFORMER

Filed Nov. 23, 1931

Inventor:
Harry R. West,
by Charles E. Tullar
His Attorney.

Patented July 26, 1932

1,869,125

UNITED STATES PATENT OFFICE

HARRY R. WEST, OF PITTSFIELD, MASSACHUSETTS, ASSIGNOR TO GENERAL ELECTRIC COMPANY, A CORPORATION OF NEW YORK

VARIABLE VOLTAGE TRANSFORMER

Application filed November 23, 1931. Serial No. 576,739.

My invention relates to variable voltage transformers. Many variable voltage transformers have been proposed and used but they often include movable contacts, collector rings, flexible connections or other features which have certain disadvantages. The general object of the present invention is to provide an improved variable voltage transformer which shall avoid these disadvantages.

Figure 1:
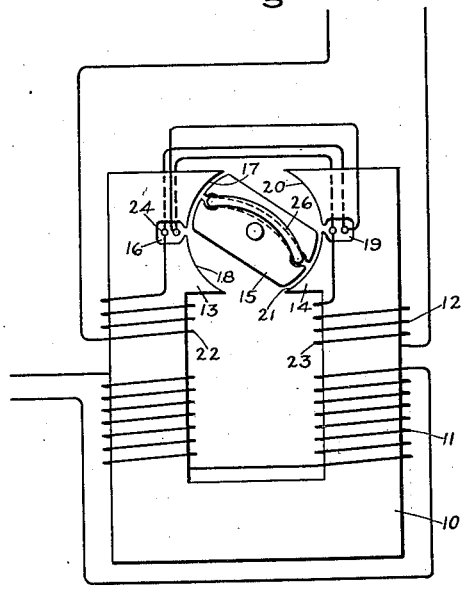
Figure 2:
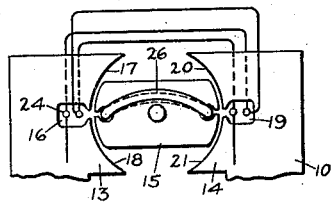
Figure 3:
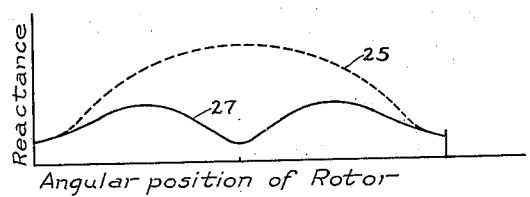

Further objects and advantages will be explained in the following description taken in connection with the accompanying drawing, in which Fig. 1 is a diagrammatic view of a variable voltage transformer constructed in accordance with the invention; Fig. 2 is a view of a section of the transformer showing a different adjustment; and Fig. 3 is an explanatory reactance diagram.

Like reference characters indicate similar parts in the different figures of the drawing.

The transformer shown in the drawing includes a magnetic core 10 having two windings 11 and 12 of which the winding 11 may be considered as the primary and the winding 12 as the secondary. The core 10 has two poles 13 and 14 separated by a gap with a magnetic rotor 15 located between the two poles in the gap. The face of the pole 13 is formed with a slot 16 which separates the pole face into two sections 17 and 18. A similar slot 19 separates the face of the pole 14 into two sections 20 and 21. The pole faces of the core and the adjacent faces of the rotor are curved concentrically about the axis of the rotor so that the gaps between them may be short and the magnetic reluctance through them small. The secondary winding 12 includes two sections 22 and 23 connected in series with each other and with a third section 24 of a few turns located in the slots 16 and 19.

The magnetic flux induced by the primary winding 11 flows through the core 10 and the rotor 15 and induces voltages in the three sections 22, 23 and 24 of the secondary winding, these three voltages being in series and together constituting the total secondary voltage. The voltage induced in the section 24 of the secondary winding and therefore the total secondary voltage may be varied by varying the position of the rotor 15. The rotor is shown in Fig. 1 in a position to direct all the core flux between the surface or section 17 of the core pole 13 and the surface or section 21 of the core pole 14. All the flux thus passes through the winding section 24 and induces a maximum voltage in series with and in the same direction with the voltages in the winding sections 22 and 24.

The rotor 15 is shown in Fig. 2 in its neutral position in which half the core flux is directed past each side of the winding section 24. Therefore, none of the flux passes through this winding section, no voltage is induced in it, and the total secondary voltage is the sum of the voltages in the two sections 22 and 23. As the rotor 15 is turned from its maximum position of Fig. 1 to its neutral position of Fig. 2, the voltage induced in the winding section 24 of course gradually decreases from its maximum value to zero.

The rotor 15 may be turned still further till it lies between the surface or section 18 of the core pole 13 and the surface or section 20 of the core pole 14, when all the core flux will again pass through the winding section 24 but in a direction to induce a maximum voltage in a direction opposite to that of the voltages in the winding sections 22 and 23. The total secondary voltage is then a minimum.

The secondary current in the winding section 24 tends to produce leakage magnetic flux in paths surrounding the slots 16 and 19. It is desirable to keep this flux small, because it increases the reactance of the secondary circuit of the transformer. The gap across the mouth of each of the slots has high reluctance, so that very little leakage flux can flow directly through these gaps. However, when the position of the rotor is such that it bridges these gaps, leakage flux tends to flow through the rotor past the slots and the reactance of the secondary winding tends to vary with the position of the rotor as indicated by the broken curve 25 in Fig. 3, the reactance being objectionably high except when the rotor is at or near one of its extreme positions.

The high reactance is effectively reduced by a closed or short circuited winding 26 arranged in suitable slots in the rotor 15 so that the reactance of the secondary winding varies with the position of the rotor as indicated by the curve 27 in Fig. 3. When the rotor is in its neutral position as indicated in Fig. 2, the short circuited winding 26 prevents leakage flux from flowing around the slots 16 and 19 and the reactance of the secondary winding has substantially the same minimum value as when the rotor is in either extreme position. When the rotor is between its neutral position and either extreme position, leakage flux may flow through only one side of the rotor but the cross section of the flux path is small. The amount of leakage flux and the reactance of the secondary circuit are therefore small.

The invention has been explained by describing and illustrating a particular embodiment thereof, but it will be apparent that changes may be made without departing from the spirit of the invention and the scope of the appended claims.

What I claim as new and desire to secure by Letters Patent of the United States, is:

1. A transformer including a magnetic core having a gap, primary and secondary windings on the core, a magnetic rotor in said gap, one of said windings having a section surrounding said gap and rotor, and a closed winding on said rotor to reduce the reactance of the surrounding winding section.

2. A transformer including a magnetic core having a gap, primary and secondary windings on the core, a magnetic rotor in said gap, the secondary winding having a section surrounding said gap and rotor, and a closed winding on said rotor to reduce the reactance of said secondary winding.

3. A transformer including a magnetic core having a gap, said core having slots at opposite sides of said gap, primary and secondary windings on the core, a magnetic rotor in said gap, one of said windings having a section arranged in said slots and surrounding said gap and rotor, and a closed winding on said rotor to reduce the reactance of the surrounding winding section.

In witness whereof, I have hereunto set my hand.

HARRY R. WEST.